Oct. 15, 1968     S. BAXTER ETAL     3,406,230
EXTRUSION OF RESINS
Filed June 18, 1964
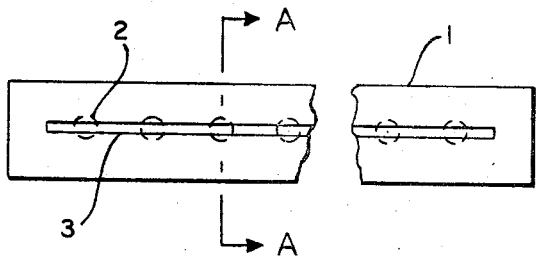
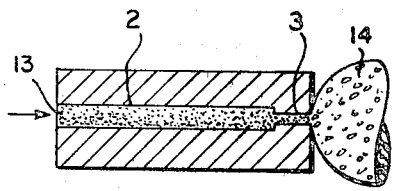
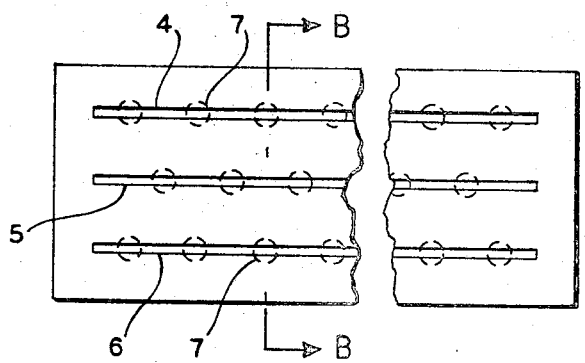
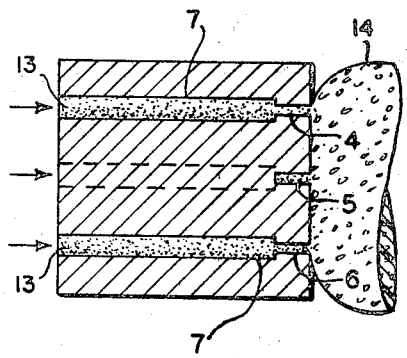
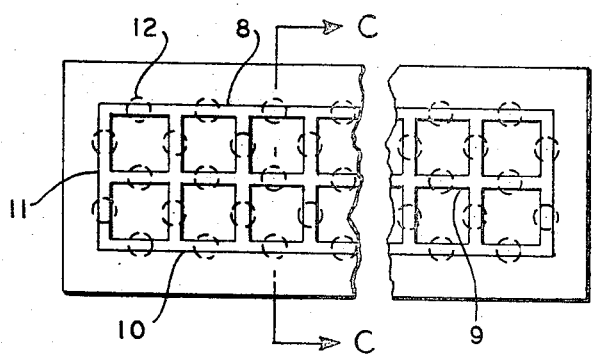
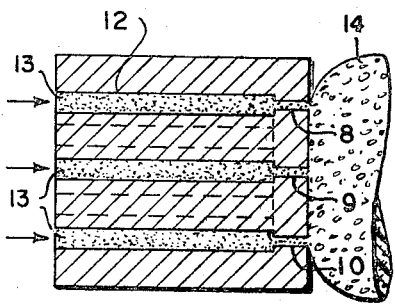
SAMUEL BAXTER – JOHN H. GILBERT    INVENTORS
BY *William F. Mufatti*
ATTORNEY.

United States Patent Office 3,406,230
Patented Oct. 15, 1968

3,406,230
EXTRUSION OF RESINS
Samuel Baxter, Penhow, and John Harold Gilbert, Shire Newton, Chepstow, England, assignors to Monsanto Chemicals Limited, London, England, a British company
Filed June 18, 1964, Ser. No. 376,089
Claims priority, application Great Britain, June 24, 1963, 25,001/63
10 Claims. (Cl. 264—51)

ABSTRACT OF THE DISCLOSURE

This application is directed to a continuous die extrusion process for producing a foamed thermoplastic synthetic resin by first coalescing separate molten foamable streams and then expanding the thus coalesced mass into a foam resin.

---

This invention relates to an improved extrusion process for preparing a foamed thermoplastic synthetic resin.

Foamed resins are useful industrial products, because they have excellent heat-insulating properties. They are often made by molding, but it has been proposed to produce foamed resins by an extrusion process in which a thermoplastic synthetic resin, having in admixture therewith a foaming agent, is extruded under pressure through a die so that expansion of the foaming agent causes foaming of the resin. Processes of this type, however, have not been entirely successful for all purposes, and it is for instance difficult to produce foamed polystyrene board of a substantial thickness by extrusion because, for example, the extruded board has a wrinkled surface, is liable to warp and the foamed cells collapse.

The prior art, U.S. Patent 3,121,130, discloses a process of extruding a foamed thermoplastic sheet by extruding a foamable material through multiple orifices into individual elements and then expanding the individual elements in close proximity to each other so that they will coalesce. The expansion of the elements occurs at atmospheric pressure and the elements or strands are united after almost complete expansion thereof.

It has now been surprisingly discovered that by coalescing the strands or elements under a pressure sufficient to prevent foaming and then foaming the coalesced mass by extruding into the atmosphere, a homogenous foamed product results having no surface striations and no delaminations of the individual strands.

Therefore it is an object of this invention to provide an improved process for extruding a foamed thermoplastic synthetic resin.

Other objects and advantages of the invention will be apparent from the detailed description thereof and when read in conjunction with the drawings where:

FIG. I is a front elevation of one construction of the die of this invention;

FIG. II is a section along the A—A in FIG. I;

FIG. III is a front elevation of an alternate construction of the die of this invention;

FIG. IV is a section along the line B—B in FIG. III;

FIG. V is a front elevation of another alternate construction of the die of this invention; and FIG. VI is a section along the line C—C in FIG. V.

The die shown in FIGS. I and II consists of a mild steel block 1 having extending into it from one side a row of cylindrical channels 2 which channels are equally spaced. Channels 2 communicate with slit 3. The die has means (not shown) for attaching it to the front end of an extruder so that when the die is in use, a foamable resin such as foamable polystyrene, is fed into the channels and hence into the slit.

In the die shown in FIGS. III and IV, parallel slits 4, 5 and 6, respectively, are similar to that shown in FIGS. I and II and each has associated with it a row of channels 7 as indicated.

FIGS. V and VI show a die having a rectangular network of intercommunicating slits 8, 9, 10 and 11, respectively. Each slit has associated with it a row of channels 12.

A foamable resin 13 passing through the respective dies and expanding into a foamed mass 14 is illustrated in FIGURES II, IV, and VI.

In the preferred die of this invention, the channels are equally spaced at about 0.25" apart and are about 0.825" long and about 0.04" in diameter. The slits communicating with the channels have a dimension of about 0.015" wide, 4" long and have a land of 0.125".

The process of this invention is a continuous process for preparing an extruded foamed thermoplastic synthetic resin which process comprises forming multiple strands of a molten foamable thermoplastic resin under a pressure sufficient to prevent foaming of the foamable thermoplastic synthetic resin strands, coalescing the molten strands while still under said pressure and then expanding the resulting coalesced mass into a foamed thermoplastic synthetic resin. More specifically, the process comprises (1) passing a foamable thermoplastic resin through a plurality of separate channels in a die which channels communicate with a slit at the outlet end of the die, (2) coalescing the foamable thermoplastic synthetic resin in the slit of the die and (3) extruding the resulting coalesced mass into a foamed thermoplastic synthetic resin. The pressure within the die is sufficient to prevent foaming of the foamable thermoplastic synthetic resin within the die.

The invention is also directed to a die adapted for the extrusion of a foamed thermoplastic resin, which die has in combination a series of separate channels communicating with a slit at the outlet end of the die. The channels in the die are normally circular in cross-section, and their other dimension is that along the direction of the flow of the resin, which is the "land" of the channels. However, the channels need not necessarily be circular in cross-section, and they can for instance be of some shape that is substantially circular and that can be said to posses a diameter, for example hexagonal or even perhaps square. Preferably the channels as well as being of circular cross-section are arranged symmetrically behind the slit.

The dimensions of the slit are measured in terms of the land, which as stated above is the measurement along the direction of the resin flow, and the cross-section, which is made up of the width and the length, the length being the larger of these two linear dimensions. In general the width of the slit is less than the diameter of channels positioned behind it; for instance the diameter of the channels is often from 1.3 to 10 times, especially from 2 to 5 times, the width of the slit. Although a straight slit is often employed so that the resin is extruded in the form of a board, this is not necessarily so and a curved slit can be used, the curved section of foamed resin thus produced being useful for such purposes as ceiling coving or pipe insulation. Preferably there is more than one slit in the die, for instance a number are arranged parallel to one another or in the form of a network, each slit having its associated row of channels. A network of slits can for example be in the form of a rectangular or triangular grid, for example a series of squares or a six-pointed star within a hexagon A network of slits can be arranged to produce a hollow product. The length of the slit can be as much as desired, for instance from ¼" to 60" or even more, depending on the dimensions desired in the final extruded foamed resin. The width of the slit also bears some relationship to the thickness of the extruded resin, but is also to some extent dictated by the maximum practical extrusion rate. In general a width of slit between 0.01 and 0.25", for instance from 0.02 to 0.1" and especially about 0.025", has been found suitable. The land of the slit can for instance be between 0.05" and 2", especially between 0.1 and 0.5".

Preferably the channels and the slit are so designed that the residence time of the resin in the slit is relatively short compared with that in the channels. Such conditions can for example be achieved by suitable choice of the length of "land" of the channels and of the slit. Often, the land of the channels is between 2 and 20 times the land of the slit, and for example where polystyrene is to be extruded the land of the channels can for instance be from 4 to 15 times the land of the slit. Where polyethylene is to be extruded the land of the channels can for instance be from 2 to 6 times the land of the slit. For other resins the ratio can be more or less than these values, depending on whether the viscoelastic memory of the resin is low or high.

The process of the invention is particularly useful for producing foamed resin in the form of a board, whose dimensions depend of course on those of the die and the degree of foaming that occurs when the resin leaves the die. Generally, greater expansion takes place across the width of the slit than along its length, and for instance a board that is 1 to 2" thick can be produced from a narrow slit by the process of this invention.

The thermoplastic synthetic resins which can be employed in the practice of this invention include cellulose ethers and esters, e.g., ethyl cellulose, cellulose acetate, cellulose nitrate, cellulose butyrate; homopolymers and interpolymers of monomeric compounds containing the vinylidene grouping $CH_2=C<$ such as vinyl halides, e.g., vinyl chloride, vinyl bromide; vinylidene chloride; olefins, e.g., ethylene, propylene, isobutylene; vinyl esters of carboxylic acids, e.g., vinyl acetate, vinyl propionate, vinyl benzoate; vinyl ethers, e.g., vinyl methyl ther, vinyl isobutyl ether; unsaturated carboxylic acids and derivatives thereof, e.g., acrylic acid, methacrylic acid, acrylic acid and methacrylic acid esters of alcohols containing 1–18 carbon atoms such as methyl and ethyl methacrylate, acrylamide, methacrylamide, methacrylonitrile, acrylonitrile; vinyl aromatic compounds, e.g., styrene, alpha-methylstyrene, vinyl toluenes, p-ethylstyrene, 2,4-dimethylstyrene, o-chlorostyrene, 2,5-dichlorostyrene, vinyl naphthalene; and interpolymers of vinylidene monomers of the above type with alpha, beta-unsaturated polycarboxylic acids and derivatives thereof e.g., maleic anhydride, diethyl maleate, dibutyl fumarate, etc. It may be feasible and desirable to employ blends of two or more thermoplastic synthetic resins such as blends of styrene polymers with rubbery diene polymers such as natural rubber, butadiene-styrene interpolymers, butadiene-acrylonitrile interpolymers and the like. Styrene graft copolymers prepared by polymerizing monomeric styrene, either alone or in admixture with other vinylidene monomers such as acrylonitrile, in the presence of a rubbery diene polymer may also be employed advantageously. The preferred thermoplastic synthetic resins to be employed in the practice of this invention are styrene homopolymers and styrene interpolymers containing at least 50% by weight of styrene and up to 50% by weight of a vinylidene monomer interpolymerizable therewith, i.e., butadiene, acrylonitrile, alpha-methylstyrene and the like.

The resin used in the process is of course foamable, and this means that it is in admixture with a blowing agent or foaming agent which is preferably a volatile foaming agent having a boiling point of less than 100° C. In some cases the blowing agent may be one that is normally gaseous at atmospheric pressure but which while under pressure before extrusion is present in the liquid state. Examples of a volatile foaming agent that can be used include lower aliphatic hydrocarbons such as ethane, propane, butane or pentane, lower alkyl halides such as methyl chloride, trichloromethane or 1,2-dichlorotetrafluoroethane, and inorganic gases such as carbon dioxide or nitrogen. The lower aliphatic hydrocarbons, especially butane, are preferred. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. From 3 to 30% especially from 7 to 20%, by weight based on the weight of the resin is often a suitable proportion of blowing agent, and for example the use of from 7 to 15% by weight of butane in conjunction with polystyrene has given excellent results.

The process of the invention is particularly applicable to the production of foamed resins, such as polystyrene, having a density between 0.5 and 10 lbs./cu. ft. and especially between 1 and 5 lbs./cu. ft.

The extrusion temperature, which is the temperature of the die and the resin within it, depends to some extent on the softening point of the resin, but in general temperatures between 95° C. and 180° C. and preferably between 100° C. and 160° C., are suitable. For example, when foamable polystyrene is being extruded a temperature in the range 130° C. to 160° C. can be used, while for polyethylene somewhat lower temperatures, for instance 100° C. to 120° C., are often very suitable.

The pressure within the die is sufficient to prevent the resin from foaming until it leaves the slit. Pressures for example greater than 250 lbs./sq. in., and especially between 250 and 500 lbs./sq. in., can be employed. Preferably the pressure is between 300 and 1000 lbs./sq. in.

The process of the invention is illustrated by the following examples.

Example I

This example describes a process according to the invention for the production of foamed polystyrene.

Foamable polystyrene pellets containing 7% by weight of butane are extruded at a pressure of about 500 lbs./sq. in. and at a temperature of about 150° C. through a die as illustrated in FIGS. V and VI and at a flow rate of 30 lbs./hr. The extruded polystyrene is passed between a pair of rollers set ¾" apart.

The foamed board of polystyrene is 6" wide by ¾" thick and has a density of about 1½ lbs./cu. ft. It has good strength in both the transverse and longitudinal directions, and the surfaces thereof are satisfactorily smooth.

For the purposes of comparison a similar foamable polystyrene mixture was extruded through a die comprising a number of channels without any slit, and attempts were made to consolidate the resulting foamed strands by passing them between rollers or by passing them through a restricted shaping box. The results were completely unsatisfactory in each instance because of the lines of weakness which existed along the joins between the strands. Attempts to extrude foamed polystyrene through slit dies (without any channels in communication with them) also resulted in an unsatisfactory product, the board being badly wrinkled and warped.

Example II

This example describes a process according to the invention for the production of foamed polyethylene.

Foamable polyethylene containing 15% by weight of butane and 3% of finely-divided silica (to act as nucleating agent) is extruded at a pressure of 400 lbs./sq. in. and temperature 110° C. through a die similar to that illustrated in FIGS. V and VI, but having three horizontal and 3 vertical equally spaced slits wherein, each slit has a length of 0.4", a width 0.025" and a land 0.125". Each slit has communicating with it 2 channels having a diameter of 0.11" and a land 0.5". The flow rate is 10 lbs. of resin per hour.

The foamed polyethylene has a cross-section similar in shape to the cross-section of the die, but having external dimensions approximately 1″ square and having a density of about 3 lbs./cu. ft. It is resilient and of good strength in both the transverse and longitudinal directions, and it is difficult to discern the effect of the channels in the foamed product.

Comparative experiments similar to those described in Example I failed to produce a useful product, for the reasons outlined in that example.

It will thus be seen that the objects set forth above, among those made apparent from the preceding description, are efficiently attained, and since certain changes may be made in carrying out the above process and in the composition set forth without departing from the scope of the invention, it is intended that all matters contained in the above description shall be interpreted as illustrative and not in a limiting sense.

What is claimed is:

1. A continuous die extrusion process which comprises forming multiple streams of a molten foamable thermoplastic resin by passing the resin through a die having at its inlet end a plurality of separate channels communicating with a slit at the outlet end of the die, coalescing the streams of resin in the slit, and then expanding the coalesced mass into a foamed thermoplastic resin; the pressure within the die being sufficient to prevent substantial foaming of the resin before it leaves the slit.

2. The process of claim 1 wherein the channels are substantially circular in cross-section and are arranged symmetrically behind the slit.

3. The process of claim 1 wherein the diameter of the channels is about 2–5 times the width of the slit.

4. The process of claim 1 wherein the land of the channels is about 2–20 times the land of the slit.

5. The process of claim 1 wherein the land of the slit is about 0.1–0.5 inch.

6. The process of claim 1 wherein the width of the slit is about 0.02–0.1 inch.

7. The process of claim 1 wherein the outlet end of the die is provided with a plurality of slits arranged in the form of a network, each slit communicating with a row of channels.

8. The process of claim 1 wherein the resin is a styrene polymer.

9. The process of claim 8 wherein the styrene polymer is polystyrene.

10. The process of claim 1 wherein the resin is polyethylene.

References Cited

UNITED STATES PATENTS

| | | | |
|---|---|---|---|
| 2,766,480 | 10/1956 | Henning | 264—47 |
| 2,766,481 | 10/1956 | Henning | 264—47 |
| 2,848,739 | 8/1958 | Henning | 264—47 XR |
| 3,026,273 | 3/1962 | Engles | 264—53 XR |
| 3,160,688 | 12/1964 | Aykanian et al. | 264—53 |
| 2,061,042 | 11/1936 | Parkhurst | 18—12 |
| 2,734,224 | 2/1956 | Winstead | 18—12 |
| 2,748,401 | 6/1956 | Winstead. | |
| 2,945,261 | 7/1960 | Aykanian et al. | 264—53 |
| 3,121,130 | 2/1964 | Wiley et al. | 264—53 |
| 3,212,134 | 10/1965 | Yokana | 18—12 X |
| 3,229,005 | 1/1966 | Reifenhauser | 18—12 X |

JAMES A. SEIDLECK, *Primary Examiner.*

PHILIP E. ANDERSON, *Assistant Examiner.*